Patented Mar. 5, 1935

1,993,278

UNITED STATES PATENT OFFICE 1,993,278

MANUFACTURE OF RUBBER OR SIMILAR MATERIALS

Edward Arthur Murphy and Douglas Frank Twiss, Wylde Green, Birmingham, England, assignors to Dunlop Rubber Company, Limited, Birmingham, England, a British corporation No Drawing. Application May 10, 1932, Serial No. 610,497. In Great Britain June 30, 1931

13 Claims. (Cl. 18—50)

This invention comprises improvements in or relating to the manufacture of goods of rubber or similar material from aqueous emulsions or dispersions of the kinds hereinafter specified.

The object of the invention is to produce porous or micro-porous articles of vulcanized rubber or the like, in particular battery separators or filtering diaphragms.

According to the invention the process for the manufacture of porous or micro-porous articles of vulcanized rubber or the like comprises converting aqueous emulsions or dispersions of the kinds hereinafter specified into flocculent or granular precipitates, effecting compacting of the aforesaid flocculent or granular precipitates by a filtering operation, and thereafter vulcanizing in known manner the products so obtained under such conditions that evaporation of the liquid contained therein is prevented.

The filtering operation may be carried out in conjunction with one or more operations such as moulding, spreading, impregnating or dipping.

It has been known for some time that instead of the usual adherent coagulum it is possible to obtain rubber as a flocculent precipitate from latex by the use of certain coagulants and by adjustment of the concentration of the latex, as for instance, "Estate Rubber" O. de Vries, page 143, 1920.

The aforesaid flocculent or granular precipitates can be prepared from rubber latex in controllable manner by the use of varied coagulating agents and methods of coagulation provided that the coagulation is effected in the presence of a relatively large quantity of water and with or without the presence of certain amounts of alkaline or colloidal substances found to have a restraining effect upon the coagulation.

The filtering means employed may be for example, of ceramic material, cotton fabric, or fine mesh wire gauze. If desired suction may be employed to aid filtration and/or pressure may be applied to the filter cake.

After a large proportion of the water has been removed a compact sheet of coagulum is obtained which may be removed and moulded in wet condition and thereafter vulcanized under such conditions that evaporation of the liquid contained therein is prevented. The vulcanized product is then dried.

Examples of suitable coagulants are acetic acid, formic acid, hydrochloric acid, sulphuric acid, sodium silicofluoride, aluminum chloride, alum, barium chloride, calcium nitrate, zinc sulphate, magnesium acetate, magnesium sulphate, ferrous sulphate, and ferric sulphate.

Examples of substances having a restraining effect on the coagulation are caustic potash, casein, sodium aluminate, glue and gum acacia. The amount of such substances used also influences the degree of subdivision of the granular dispersion.

The degree of concentration has also an influence on the fineness of the precipitate. In general the lower the concentration the finer the initial precipitate.

The aqueous dispersions aforesaid are preferably employed at such dilutions that 100 ccs. thereof contain not more than 10% of total solids.

By the suitable choice of reagents and conditions of working granular dispersions of varying consistency can be formed.

If desired the granular precipitates can be washed free from soluble reaction products such as soluble sulphates or chlorides by known means as for instance by decantation or filtration and washing prior to their compacting.

The emulsions or dispersions of rubber or the like comprise those consisting of rubber, guttapercha, balata, or similar vegetable resins occurring naturally or artificially obtained. Such artificial aqueous dispersions may include those of coagulated rubber, vulcanized rubber, synthetic rubber, waste or reclaim.

If desired any of the aforementioned dispersions may be used alone or in admixture with one another.

Any of the aforesaid dispersions may contain the usual known compounding and vulcanizing ingredients and/or may be in the first instance in concentrated form.

It is desirable that the proportion of vulcanizing ingredient should be high.

Concentrates such as are obtained in Patent No. 1,846,164 to which may be added any one or more of the usual known compounding ingredients may also be employed subsequent to dilution.

The aforesaid vulcanization and/or compounding ingredients which are added in the form of their dispersions may be added to the aforesaid aqueous emulsions or dispersions of rubber or the like prior or subsequent to the precipitation of the granular or flocculent coagula.

It is preferable to add the aforesaid dispersions of the vulcanizing and other compounding ingredients before the precipitation of the granular precipitates. In some cases where the precipitate obtained is found to be in a damp powdery or short paste-like condition before conversion into a compact uniform mass, compacting can be hastened and facilitated by treating the filter cake obtained with one or more organic solvents as, for instance, alcohol, carbon tetrachloride.

In carrying out the process of the present invention it has been found desirable to prevent the shrinkage of the wet coherent mass during vulcanization by employing means for maintaining it in a distended condition for instance by placing it between plates preferably having embossed patterns on their surfaces or between layers of fabric material.

The following examples illustrate how the process can be effected for the production of micro-porous battery separators.

Example 1

A latex mixing having the following compositions:—

| | Parts by weight |
|---|---|
| Rubber | 100 |
| Sulphur | 40 |
| Zinc oleate | 3 |
| Mercaptobenzothiazole | 0.5 |
| Mineral oil | 10 |
| China clay | 10 |
| Zinc oxide | 2 | is prepared from a 60% rubber latex obtained by centrifugal action.

The mixing is compounded and concentrated according to the processes described and claimed in Patent No. 1,846,164.

The final solid content of the mixing is 53%. This mixing is converted into a granular precipitate in the following manner.

To 100 grams of the mixing water is added to make the volume up to 640 cc. 100 cc. of this diluted mixing will then contain 5 grams of rubber.

To 500 grams of the diluted mixing 25 cc. of a 5% casein solution are added while stirring and 17.5 cc. of a 10% acetic acid solution are subsequently added, the mixture being well stirred. The precipitate suspension so obtained is poured on to a filter and left for a few minutes until a continuous spongy sheet still containing a large proportion of the water is obtained.

The sheet is placed in a mould which is then clamped and placed in hot water and subjected to a steam pressure care being taken that the mould is totally immersed during the vulcanization. Good vulcanization can be made to take place in 2½ hours at 75 to 80 lbs. pressure of steam after which the mould is cooled before opening and the separator produced is rinsed and allowed to dry.

More than one battery separator can be produced in one operation by effecting the filtering with the aid of a suitably constructed filter press so as to give filter cakes of the correct dimensions and patterns for immediate vulcanization with or without the removal of the filter cakes from the press.

Example 2

To 100 grams of the latex mixing prepared as described in Example 1, 6.5 ccs. of a 10% caustic potash solution and 200 ccs. of water are added. While the mixing is being stirred 20 cc. of an 8% sodium silicate solution is first added and then 20 cc. of a 10% solution of magnesium sulphate (crystals). The precipitate obtained is then poured on to a filter and the continuous spongy sheet thus formed is then treated in the same way as the spongy sheet formed according to Example 1.

Having now particularly described and ascertained the nature of our said invention and in what manner the same is to be performed, we declare that what we claim is:—

1. A process for the manufacture of porous or micro-porous articles of vulcanized rubber or the like from aqueous dispersions containing rubber material which comprises converting the aqueous emulsions or dispersions aforesaid into grannular or flocculent precipitates, filtering said precipitates to a compact mass and thereafter vulcanizing said mass under such conditions that evaporation of the liquid contained therein is prevented.

2. A process as claimed in claim 1 wherein the mass is formed to shape during said filtering operation.

3. A process as claimed in claim 1 wherein suction is employed to aid filtration.

4. A process as claimed in claim 1 wherein pressure is applied to the filter cake.

5. A process as claimed in claim 1 wherein shrinkage of the wet coherent mass during vulcanization is prevented by employing means for maintaining it in a distended condition.

6. A process for the manufacture of porous or micro-porous articles of vulcanized rubber composition which comprises forming a granular or porous precipitate from an aqueous dispersion of rubber material, depositing said precipitate in a compact mass containing aqueous medium dispersed between said particles of precipitate and vulcanizing said mass without vaporizing said dispersed aqueous medium in said mass.

7. A process for the manufacture of porous or micro-porous articles of vulcanized rubber which comprises forming a fine grained precipitate of predetermined size from aqueous dispersions of rubber material, withdrawing a part of the aqueous medium from said precipitate to form a compact mass of rubber material containing a part of said aqueous medium entrapped among the particles of said precipitate in finely dispersed condition and thereafter vulcanizing said rubber material without vaporizing said entrapped aqueous medium.

8. The process of claim 6, in which a rubber solvent is used to unify said particles.

9. The process of claim 6, in which said dispersion contains compounding ingredients.

10. The process of claim 6, in which an inert insoluble inorganic compounding ingredient is formed by the interaction of soluble reagents at the time said rubber precipitate is formed and is precipitated with said rubber.

11. The process of claim 6, in which an insoluble silicate is formed at the time of the precipitation of said rubber and is precipitated therewith by the interaction of solutions of an alkali silicate and a salt whose anion forms an insoluble silicate.

12. The process of claim 6, in which a precipitate of magnesium silicate is formed and precipitated with said rubber precipitate by the interaction of an alkali silicate and a magnesium salt.

13. The process of claim 6 in which said precipitate is treated with organic solvents before vulcanizing.

EDWARD ARTHUR MURPHY.
DOUGLAS FRANK TWISS.